United States Patent
Perry

(10) Patent No.: US 7,404,207 B2
(45) Date of Patent: Jul. 22, 2008

(54) DATA SHARING AND NETWORKING SYSTEM FOR INTEGRATED REMOTE TOOL ACCESS, DATA COLLECTION, AND CONTROL

(75) Inventor: Stuart Perry, Lakeworth, FL (US)

(73) Assignee: ILS Technology, Inc., Boca Raton, FL (US)

( * ) Notice: Subject to any disclaimer, the term of this patent is extended or adjusted under 35 U.S.C. 154(b) by 705 days.

(21) Appl. No.: 10/385,442

(22) Filed: Mar. 12, 2003

(65) Prior Publication Data

US 2003/0229805 A1 Dec. 11, 2003

Related U.S. Application Data

(60) Provisional application No. 60/363,251, filed on Mar. 12, 2002.

(51) Int. Cl.
*H04L 29/00* (2006.01)
(52) U.S. Cl. ....................................................... 726/15
(58) Field of Classification Search ..................... 726/15
See application file for complete search history.

(56) References Cited

U.S. PATENT DOCUMENTS

| 6,594,589 | B1 | 7/2003 | Coss, Jr. et al. |
| 6,748,287 | B1 | 6/2004 | Hagen et al. |
| 2001/0020195 | A1 | 9/2001 | Patel et al. |
| 2001/0054044 | A1 | 12/2001 | Liu et al. |
| 2002/0022969 | A1 | 2/2002 | Berg et al. |
| 2002/0029086 | A1 | 3/2002 | Ogushi et al. |
| 2002/0077981 | A1 | 6/2002 | Takatori et al. |
| 2003/0041136 | A1* | 2/2003 | Cheline et al. ............... 709/223 |
| 2003/0079121 | A1* | 4/2003 | Gilman et al. ............... 713/153 |
| 2003/0171885 | A1 | 9/2003 | Cross, Jr. et al. |

FOREIGN PATENT DOCUMENTS

| WO | WO 01/33759 A1 | 5/2001 |
| WO | WO 01/38995 A1 | 5/2001 |

* cited by examiner

*Primary Examiner*—Kambiz Zand
*Assistant Examiner*—Andrew L Nalven
(74) *Attorney, Agent, or Firm*—Buchanan Ingersoll & Rooney PC

(57) ABSTRACT

A system for managing secure network connections among multiple FABs and OEMs is present that comprises: a plurality of VPN devices, one for each FAB and OEM; a plurality of dedicated isolation LANs, each one coupled to one of the plurality of VPN devices; and an e-diagnostic LAN, coupled to the plurality of dedicated isolation LANs, and operative to connect any OEM to any FAB according to authorization rules.

8 Claims, 15 Drawing Sheets

FIG. 11

| User | Action | DateTime | Activity | InfoComments |
|---|---|---|---|---|
| chaims | User - Logon | Jul 16, 2001 07:44:23 | | Logon successful |
| chaims | Session Creation | Jul 16, 2001 07:47:01 | | Session successfully created |
| jberry | Access Violation | Jul 16, 2001 08:03:12 | | Logon unsuccessful |
| jberry | User - Logon | Jul 16, 2001 08:04:33 | | Logon successful |
| tchase | Session - Join | Jul 16, 2001 10:26:59 | | |
| ncasey | File Transfer, Authorization #25739 | Jul 16, 2001 12:12:11 | | File signature applied and verified |
| tchase | Remote Operation - Stop, Authorization #8 | Jul 16, 2001 14:17:19 | | Implanter remotely stopped |
| fholman | Data - Subscribe to event reports | Jul 16, 2001 15:53:38 | | Report created |

DATA SHARING AND NETWORKING SYSTEM FOR INTEGRATED REMOTE TOOL ACCESS, DATA COLLECTION, AND CONTROL

CROSS-REFERENCE TO RELATED APPLICATIONS

The present application claims the benefit of U.S. Provisional Patent Application No. 60/363,251, Confirmation No. 3918, filed Mar. 12, 2002 entitled "Diagnostic System and Method for Integrated Remote Tool Access, Data Collection, and Control," to Stuart Perry et al, the contents of which are incorporated herein by reference in their entirety.

The present application is related to U.S. patent application filed Mar. 12, 2003, Ser. No. 10/385,479, entitled "Diagnostic System and Method for Integrated Remote Tool Access, Data Collection, and Control," of common assignee; and to U.S. patent application filed Mar. 12, 2003, Ser. No. 10/385,441, entitled "Data Brokering System for Integrated Remote Tool Access, Data Collection, and Control," of common assignee, both of which are incorporated by reference in their entirety.

BACKGROUND OF THE INVENTION

1. Field of the Invention

The present invention is related generally to e-Manufacturing systems and methods that represent the foundation for inter-tool, manufacturer-to-manufacturer or manufacturer-to-supplier cooperation. More particularly, it is directed to an integrated system (hereinafter "eCentre") that allows collecting, propagating, distributing, storing and transforming data or information generated by the tools to different parties.

2. Related Art

High-technology manufacturing, such as integrated circuit (IC) manufacturing, often combines computerized manufacturing tools, tool operators, computer networks and other components to achieve an efficient, profitable manufacturing environment. The IC manufacturer often collects data from the manufacturing tools to keep watch on potential manufacturing problems and inefficiencies. The data collected are usually proprietary and often sensitive.

The IC manufacturers may need to provide the collected data to third party sources, especially, for example, the manufacturers of the tools. The original equipment manufacturer (OEM), also known as a toolmaker, usually provides maintenance of the tools, either directly or through a third-party contractor. The OEM must be able to access data from the tool as well, to service the machines, and also for internal purposes.

Many IC manufacturing sites use different tools that are made by more than one OEM, often by competing OEMs. Each OEM therefore wants to keep the data from its tools confidential.

Small IC manufacturing sites may not be readily accessible to the OEMs for service. It is usually not economical to maintain an on-site OEM representative for service, and such small IC manufacturing sites must often transport their service personnel to the site when service is needed. This is also costly, and can delay manufacturing, which reduces production and profits.

What is needed then is an improved method of sharing data remotely between OEMs and IC manufacturers, and other third-parties, that maintains data security for both the OEM and the IC manufacturer and that allows remote servicing of the tools.

SUMMARY OF THE INVENTION

In an exemplary embodiment of the present invention a diagnostic system and method for integrated remote tool access, data collection, and control is disclosed.

In an exemplary embodiment, the present invention can be a system for managing secure network connections among multiple FABs and OEMs is present that comprises: a plurality of VPN devices, one for each FAB and OEM; a plurality of dedicated isolation LANs, each one coupled to one of the plurality of VPN devices; and an e-diagnostic LAN, coupled to the plurality of dedicated isolation LANs, and operative to connect any OEM to any FAB according to authorization rules.

In another exemplary embodiment, the present invention can be a method for providing secure network connections among multiple FABs and OEMs, comprising the steps of: receiving a request at an e-diagnostics LAN from one of a plurality of OEMs to connect to one of a plurality of FABs; determining if the OEM is authorized to access the FAB; connecting the OEM to the FAB with a secure point to point connection when the OEM is authorized to access the FAB; and not connecting the OEM to the FAB when the OEM is not authorized to access the FAB.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

FIG. 11 illustrates an exemplary embodiment of an audit trail GUI according to the present invention;

DEFINITIONS

Figure 1:
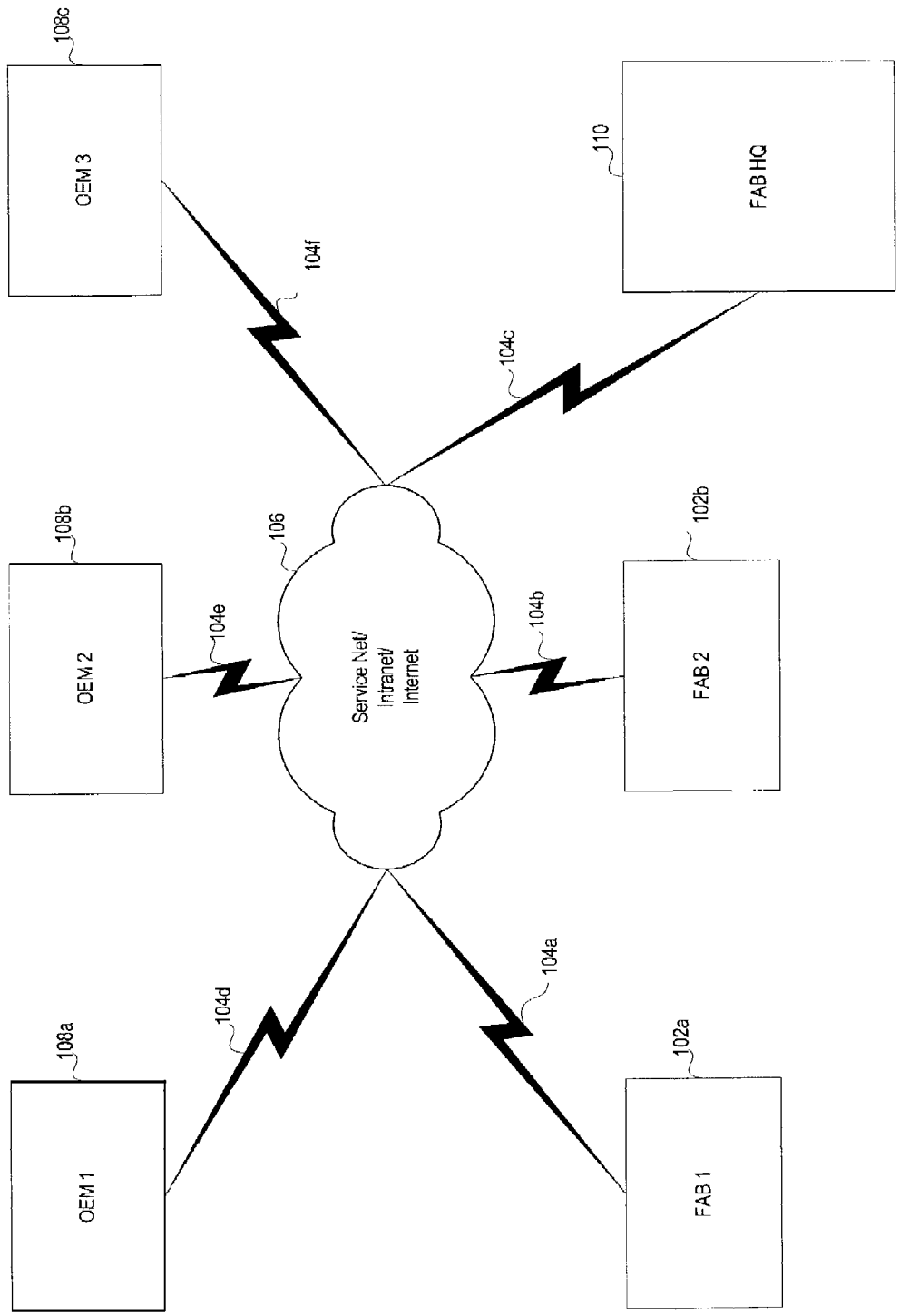
FIG. 1 depicts a block diagram of an exemplary embodiment of the system of the present invention.

As used herein, the following terms shall have the following meanings:

Fabricator (FAB): A FAB is a specific manufacturing facility. Confidential tool data is stored locally at the FAB for security.

Original equipment manufacturer (OEM): the manufacturer of integrated circuit manufacturing tools.

Integrated circuit manufacturer (ICM): an organization that manufactures integrated circuits (IC). ICMs have one or more FABs where the ICs are made. The IC-manufacturing tools are housed at ICM FABs.

Active session: A session that enables people to interact with services provided by the session, such as a remote tool operation and file transferring. A session is designated as "active" by the senior administrator when the session is created.

Authentication: The process that identifies a person—a common method is user ID and password.

Authorization: The process that determines what a person is allowed to do, such as transfer files.

Data Flow: A service that allows access to real-time equipment data. Currently, the data is transferred to a user topic (similar to a queue).

Data Storage: A service that collects equipment data and then stores the data in a database.

Delegated Administrator: A person to whom the senior administrator has given administration duties. People in this role can be either ICM facility or supplier employees.

eCentre Application Server (eCentre Application or eCentre Server or eCentre): provides the basic eCentre capabilities and a plurality of sessions and services for users and tools.

eCentre Enterprise Server: provides the ability to aggregate tool production data from multiple sites for cross-comparison.

File Transfer: A service that allows transferring of files from a tool computer to a person and from a person to a tool computer.

ICM facility senior administrator: A special type of person who is an employee of the ICM facility. The ICM facility senior administrator (or simply senior administrator) is responsible for setting up and managing sessions, users, filters, services, and tools. The senior administrator also assigns user passwords and access privileges, and delegates administrative duties where appropriate.

Passive session: A session that enables users to interact with services provided by the session, but does not permit interaction with the tool. Users have view-only privileges. For example, a user can go to a remote tool computer's desktop but only be able to view the activity. The senior administrator designates a session as "passive" when the session is created.

Privileges: Permissions that are set by the senior administrator to allow or deny users access to services such as a remote tool operation. By setting access privileges, the senior administrator controls user access to restricted data.

Session: A means by which data is shared between the tool and users. Since there is no direct access to a tool, a remote user's request for tool data is routed through a session. A session provides specific services related to the tool, such as file transferring, remote tool operation, or online chatting between session participants.

Session Participant: A person who participates collaboratively or interactively with a session. The person can be an employee of the ICM facility or the manufacturer of the tool.

Service: File transfer, remote tool operation, chat, data flow, and data storage run as services in the eCentre environment.

Staging Area: A secure server located within the ICM facility. When transferring a file from a tool computer to the user and from the user to the tool computer, there is no direct access to the tool computer; instead, the file is transferred from the tool or to the tool via a staging area.

Remote Tool Operation (RTO): A service that allows users to remotely operate a tool computer or view the operations being performed at the remote computer—all in real time. Using the Collaborative Client program, the user sees the tool computer's desktop (or control screen) and can operate the tool as if physically present. eCentre supports remote connections to Windows, AIX, UNIX derivatives, Linux, and Solaris operating environments.

Tool: A device for manufacturing some component of a semiconductor product. Tools typically reside in a highly secure and restricted area of the ICM facility. Each tool has a computer embedded within it.

Tool Computer: The computer that is embedded in the tool. Access to the tool computer is controlled through user access privileges. A tool computer can be a Windows, AIX, OS/2, UNIX derivatives, Linux, or Solaris system.

Tool Console Operator: A person who is typically physically present at the tool computer and to whom the senior administrator has assigned control privileges to the Tool Console Server. The tool console operator has the duty to give final approval for a person to remotely operate the tool computer.

Tool Console Server (TCS): A portion of eCentre that runs at the tool computer and controls access to and provides information about the RTO. Enables emergency override connection to Safety Server, and provides tool status updates.

Tool Gateway Server: A tool gateway server provides support for one or more conventional 200 and 300 mm tools. A tool gateway server provides tool access, secures tool data, and management of the tool state.

Safety Server: System that interacts with the tool hardware to provide greater measure of safety in operation.

User: Typically, a remote OEM production engineer, ICM tool expert, tool console operator, or senior administrator. The senior administrator selects a person who will participate in a session and also determines the tools and services that each person might access.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Referring now to the drawings, FIG. 1 shows a diagnostic system for integrated remote tool access, data collection, and control according to the present invention. The system generally comprises one or more fabricators (FABs) 102a, 102b (collectively 102), each of which is coupled through a respective secure shared connection 104a, 104b, and the Internet 106 to one or more original equipment manufacturers (OEMs) 108a, 108b, 108c (collectively 108) of the tools. The secure shared connection 104 can be, for example, a virtual private network (VPN), or a Service Net connection that allows a single connection to access multiple customers which would otherwise require a plurality of VPN connections. The tools are used at the FABs 102. Additionally, a fabricator headquarters 110 may also be connected through its own secure shared connection 104c to the OEMs 108 and the other FABs 102. The OEMs are also connected through their own secure shared connections 104d, 104e, 104f to the Internet 106.

Figure 2:
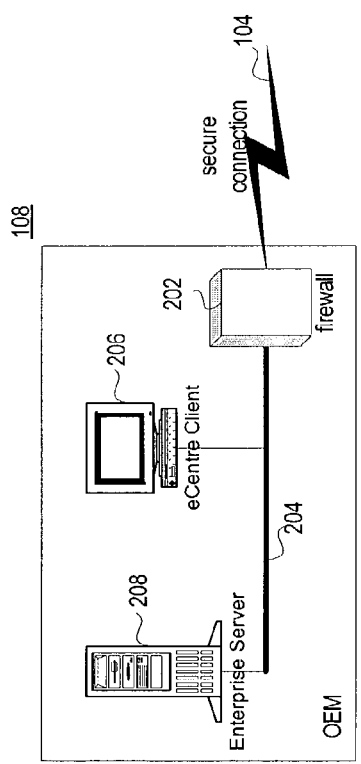
FIG. 2 depicts a block diagram of an exemplary embodiment of an OEM installation according to the present invention.

FIG. 2 depicts an exemplary embodiment of an OEM 108 according to the present invention. An OEM may be connected to its secure shared connection 104 through an internal firewall 202. An internal network 204, such as, for example a local area network, can be connected to the firewall 202. Additionally, one or more eCentre clients 206 and one or more eCentre enterprise servers 208 can be connected to the internal network 204. The enterprise server 208 can also be an eCentre server.

Figure 3:
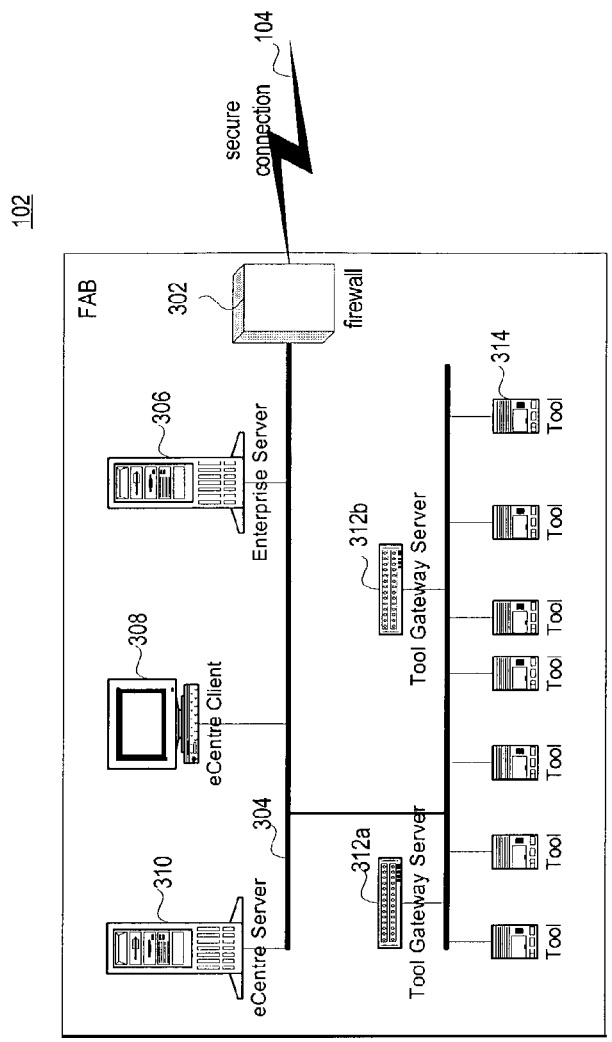
FIG. 3 depicts an exemplary embodiment of an FAB installation according to the present invention.

FIG. 3 depicts an exemplary embodiment of a fabricator (FAB) 102 according to the present invention. A FAB 102 can also connect to its secure shared connection 104 through an internal firewall 302. An internal network 304, such as, for example, a local area network, can be connected to the firewall 302. A FAB 102 can have an eCentre enterprise server 306, one or more eCentre clients 308, an eCentre server 310 and one or more Tool Gateway Servers 312a, 312b (collectively 312).

Each tool gateway server 312 provides support for conventional 200 and 300 mm tools 314, and a plurality of such tools 314 may be connected to a single tool gateway server. A tool gateway server 312 provides tool access, for example, for: SECS/HSMS, E98 OBEM, file transfer, custom data collection capabilities, remote operation, and sensor data, and co-exists with existing FAB infrastructure (e.g. station controller, MES, etc.). A tool gateway server 312 is hot-swappable. Each tool gateway server 312 also secures the data, by providing, for example, data certification, data encryption, and guaranteed data delivery. A tool gateway server 312 also provides for management of tool state, session configuration, MES interface, security gateway, and user-configurable business rules.

A secure service network provides secure communications for all constituents. One secured shared connection 104 connection from each OEM 108 can connect to multiple FABs 102. Similarly, one secured shared connection 104 connection from each FAB 102 can connect to multiple OEMs 108. Each OEM and FAB secured shared connection can terminate in its own dedicated isolation LAN. The service net is fault tolerant, does not contain any applications/logic or databases outside the firewalls, and prevents unauthorized cross-connects between OEM's and/or customers. Each constituent (OEM or FAB) controls its own data.

Software and Network Model

Figure 4:
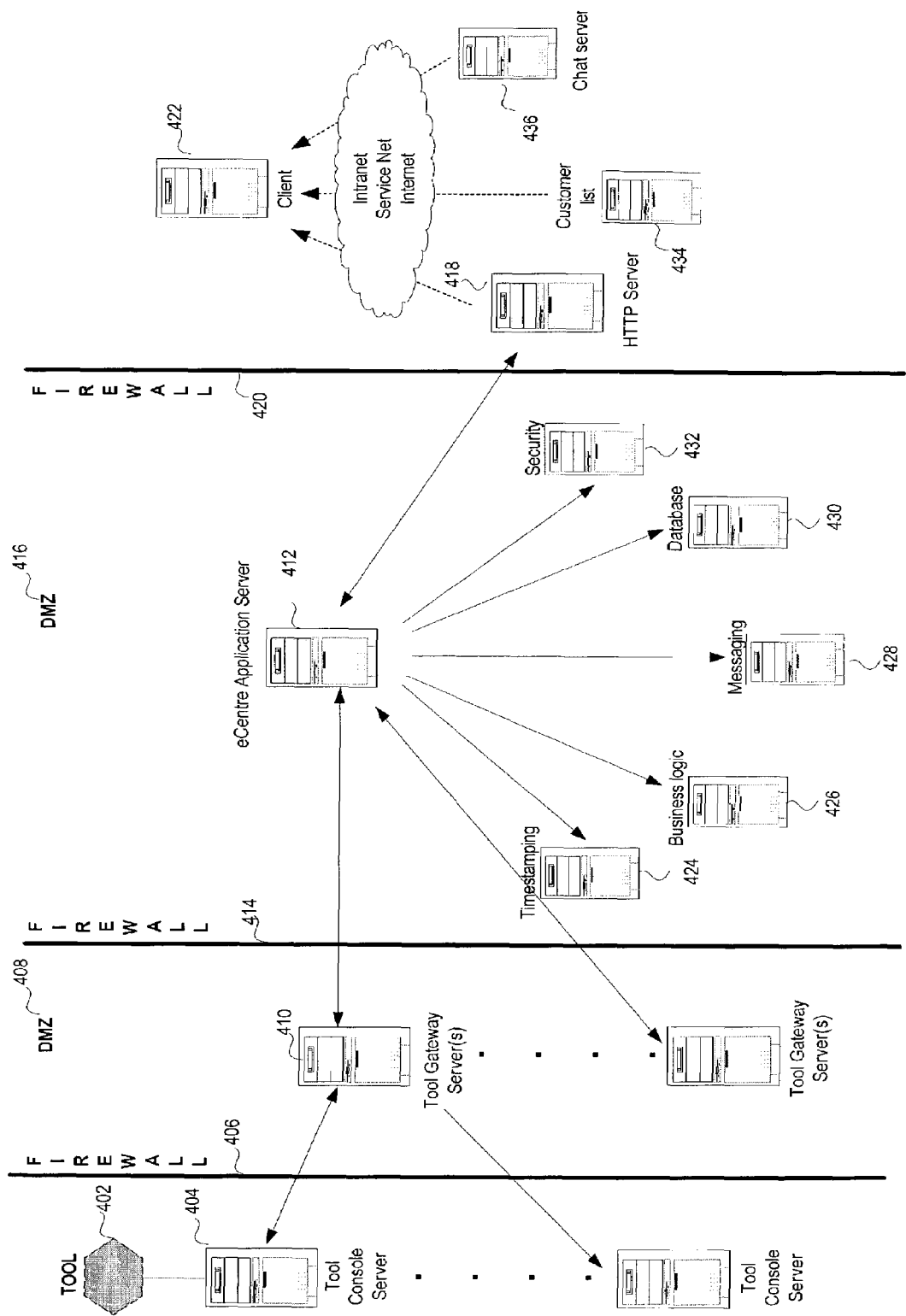
FIG. 4 depicts an exemplary embodiment of an detailed eCentre FAB installation according to the present invention.

FIG. 4 depicts an exemplary embodiment of the eCentre framework installed at a FAB site 102 housing one or more automated semiconductor manufacturing tools 402, which are each coupled to a tool console server 404. The tool 402 and the tool console server 404 are behind a first firewall 406 separated from a demilitarized zone (DMZ) 408. A DMZ is a special network segment within the ICM facility protected by firewalls. Within DMZ 408, one or more tool gateway servers 410 are coupled to the tool console servers 404 and provide access to an application server 412 across a second firewall 414. The eCentre server 412 preferably can reside in a second DMZ 416, although DMZ 408 and DMZ 416 can be, in an exemplary embodiment, a single DMZ. The application server 412 is coupled to an HTTP server 418, which can provide access to an external network such as the Internet, through a third firewall 420. A client 422 located, for example, at an original equipment manufacturer (OEM) connects through the HTTP server 418 to access the tool and services provided by the application server 412. For example, the eCentre server 412 can provide timestamping 424, business logic 426, messaging 428, database storage 430 and security 432. The client 422 also has access to a customer list 434, which indicates the FABs the client can connect to, and a chat server 436, which allows the user of the client to communicate with other users in the system.

The firewalls of the present invention can be configured to allow only authorized connections to their networks based on security policies set by the ICM. The software enables interaction with local or enterprise databases and transaction systems using, for example, Java technology-based application servers such as JBoss or IBM's WebSphere. The application servers provide a deployment environment for other eCentre components within the DMZ including support for the eCentre Server and the Tool Gateway Server. The Tool Gateway Server performs data and tool normalization across the complex set of tools within the ICM and acts as the communications interface between the tool and the eCentre application.

The main purpose of the Tool Gateway Server is to collect data from a tool so that the data can be propagated to the system. The data being collected and processed through the Tool Gateway Server is converted to XML and then sent to the eCentre application. The Tool Gateway Server registers information about the tool using a directory server such as the iPlanet LDAP product. A messaging system such as IBM's WebSphere MQ provides the mechanism to transport the data as encrypted XML. The Tool Gateway Server software can support, for example, SECS, HSMS (E4 and E5 legacy interfaces), and the current Semi E98 standard. The software also provides connectors to the ICM's MES so that true E10 states can be recorded.

A service processing application (hereinafter eCentre Application) is the main processor for sessions and services. The session is used to associate users, services and tools with each other. Session services include authentication and authorization, file transfer capabilities, remote equipment operations, decision logic, real-time collaboration (chat), data flow and data storage.

eCentre Application provides the remote user with the ability to access, upload, download, execute, and analyze results from tool diagnostics, calibrations, recipes, and user programs. In addition, the remote user can gain access to the tool computer's desktop as if standing at the tool. To secure this remote tool accessibility, the eCentre Application provides HTTP and application-level proxy services from the OEM to the ICM and from the ICM to the OEM. Access to tools by remote users is enabled through proxy servers in the DMZ. The proxy servers are created and started by the eCentre Application only when the outside request is validated. All Internet and intranet-based transmissions are encrypted.

eCentre Application provides file transfer capabilities to copy directories and files, as will be described in further detail below. eCentre enables transferring of a file from the tool to the user and from the user to the tool. There is no direct access to the tool. Instead, a file is transferred from the tool or to the tool via a staging area in the DMZ. It is a two-step process. When a download request is received by the Tool Gateway Server, the file is transferred from the tool and sent to a staging area, and then processed through the eCentre Application. To ensure security, directory and file handling privileges are mapped to a user's need to know. Only those files determined eligible are available to be downloaded or uploaded. Each transfer can be recorded, for example, by date, time, and by the user who initiated the transfer. The file is also given a version number if a tool file is replaced. This version number allows for rollback to previous operating levels if required.

As data are collected from the tool, the Tool Gateway Server in an XML format sends the data to the eCentre Application. Because there is no direct access to a tool, the remote user's request for data is routed through a session. A session is the primary collaborative device in the eCentre framework. It is the means by which data is propagated from the tools to the users. Data flowing from the tool is returned to the user via the session.

The data flow service transforms the XML into a specified message format based on one or more filters. A filter is a predefined variable whose value determines the format and content of the message. Filtered data is released to the session participants based on their privileges defined when the session was created. Optionally, the session can be configured to store the data in a repository such as IBM's DB2 for future analysis and reporting.

Control access through authentication and authorization enforces access to confidential tool data inside the ICM facility by providing authentication and authorization engines. Authentication is the process that identifies a user, for example, requiring a username and valid password; and authorization is the process that determines what a user is allowed to do—for example, transfer a file. Based on X.509 standards and biometric technology, eCentre provides authentication and authorization services by combining a policy administrator tool (such as Baltimore SelectAccess) with an LDAP-based user repository directory (such as the iPlanet server).

The policy administrator is a rule and role-based security tool that manages the content that users can see and the privileges users can have to access tool services such as remote tool operation, file transfer and data flow. Users are paired to activities and resources. An eCentre administrator can create a user and then assign the individual permission only for those activities or resources needed in a particular session. The LDAP-compatible directory server stores objects that represent user profiles, policies, sessions, and tools. Whenever the eCentre application receives a request from a user, it forwards the request to the policy administrator to ensure that the user has a valid username and password or that the individual has permission for the activity requested. The user's credentials are stored in the LDAP directory repository.

Because participants in a session must be able to communicate in real-time, eCentre provides support for chat software such as, for example, Lotus Sametime. This service is started whenever a session is started. All session participants are immediately able to communicate with one another.

Because every tooling environment has different and often complex business requirements, the eCentre Application has the ability to apply decision logic to service requests in order to determine their validity. The service is either provided or denied. For example, suppose a participant in a session tries to perform a remote operation but does not have the required level of security clearance. A message would inform the user that he or she is unauthorized to access that particular tool. The software also logs every action that occurs.

eCentre provides the means to create custom business rules or decision logic that can be used to request additional in-situ monitoring of the wafer production process based on the ICM's business rules and procedures. In addition, if necessary, the data can be persisted using a repository such as DB2.

The Administrative Client is an HTML-based program that can be available from multiple locations inside and outside the ICM facility. Typically, the eCentre administrator uses the Administrative Client. The Administrative Client works in conjunction with a policy setting administrator tool that is linked to an LDAP server. The administrator can find a session, start and stop a session, request details about a session, and view the properties of a session.

The Administrative Client can also create a session. Each session is configured to recognize one or more users and one or more tools. Each user has a specific set of rules applied that allow or deny access to certain tools.

The Administrative Client can also apply filters. The Administrative Client lets the administrator limit the type of tool data that the OEM user can see. By using predefined values as search criteria, XML data can be published showing only messages with that type of data and value. The data filters are created by the administrator who configures them with conditions and values for the condition.

The Administrative Client can also audit a session. eCentre provides a log viewer for tracking system-wide events (such as users logging on). The administrator can view the history and order of events for session activity for one or more participants and one or more sessions. Activity is logged by date, time, activity, and user information.

OEMs may wish to participate in e-diagnostic sessions at various FAB sites. The administrative client provides a utility program called the customers page to make discovery of and connection to the appropriate tool easier to do. The customers page lets remote authorized users connect to the correct eCentre Application Server within the FAB.

Authorized remote users can start the eCentre collaborative client from the customers page. However, before users can log onto the collaborative client, they must select a customer name from this page. The customer names must be set up before users can access remote tools. A file called customers.xml resides in the root directory on the eCentre Application Server. The senior administrator must set up this file with appropriate customer names. These are the customer names whose tool and tool computers are accessible to authorized users for diagnostics and repair.

The Collaborative Client allows a user outside an ICM facility to enter the controlled environment within the ICM facility for a specific purpose. A user might be an OEM production engineer or ICM tool expert. A validated user can join a session in order to access real-time tool data inside the ICM. From an active session, the user can, depending on access rules, participate in a real-time remote equipment operation; upload and download files; and chat with other users who have joined the current session.

I. Session Management Methodology

With conventional ICM/OEM infrastructure, when a semiconductor tool is not working properly, a technical support person from the tool manufacturer is usually called in to diagnose and fix it. This process can be expensive and lengthy, especially when the support person is not local to the tool site. Ideally, the support person should check the tool immediately after the malfunction. In order to allow this, the FAB can allow the support person to diagnose the system remotely. In order to protect the tool and its data from being exposed to everyone on the FAB or ICM network, the accessibility of the tool can be controlled through sessions. When sessions are set, the users (the OEM clients) can be given access to certain tools. This methodology allows the FAB to control who has access, when they have access and why they have access to the tool. A session is like a virtual meeting place for the tool support person and the tool users.

Figure 5:
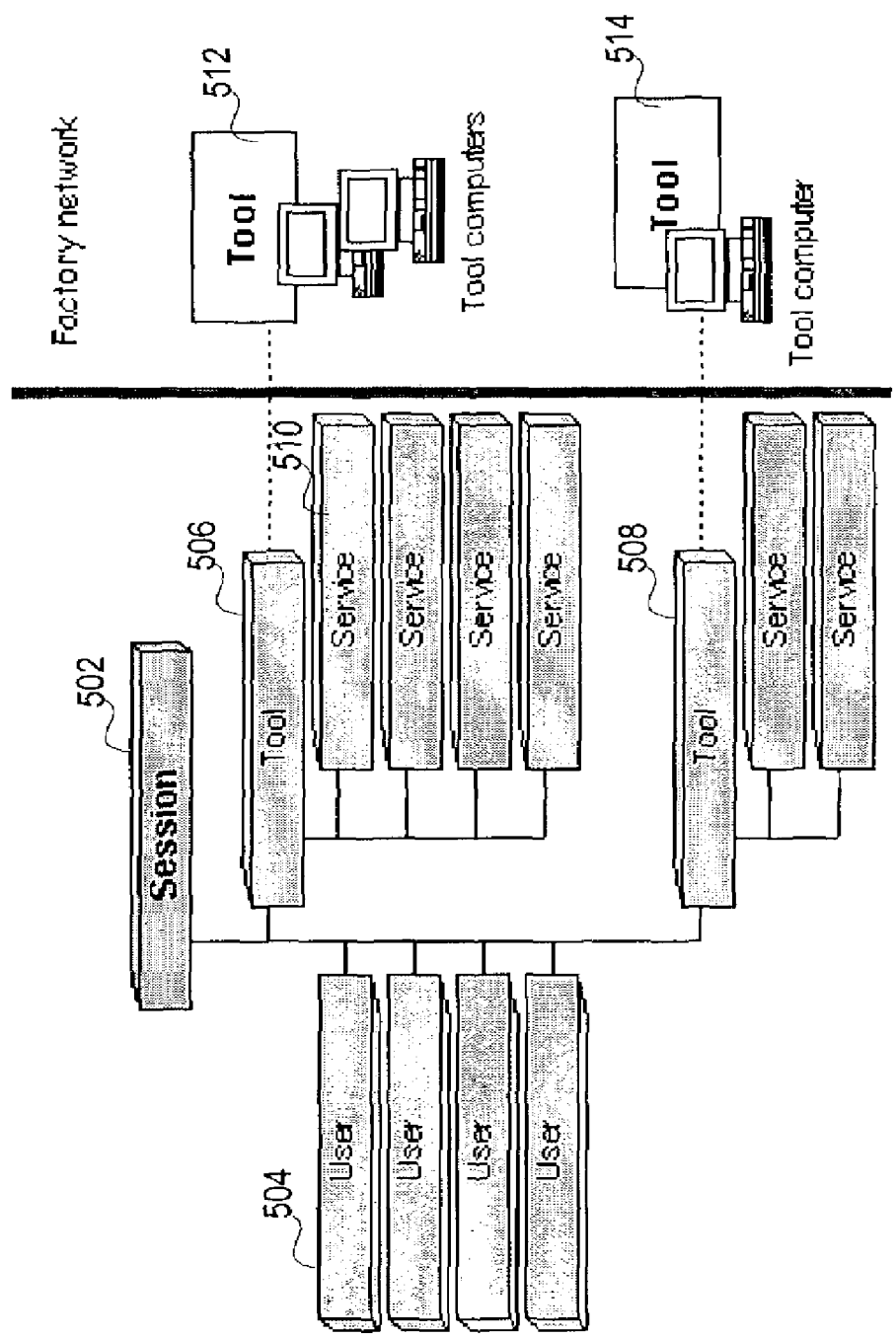
FIG. 5 depicts an exemplary embodiment of a session according to the present invention.

As seen in FIG. 5, an exemplary embodiment of a session 502 can have one or more users 504 associated with one or more tool representations 506 and 508. Each tool representation can have a number of services 510 available from it to the users. Such services include, for example, remote tool operation and file transferring. Tool representations 506 and 508 are eCentre representations of physical tools 512 and 514, respectively. For the purposes of this discussion, physical tools and tool representations are interchangeable, unless otherwise noted.

A session represents a unit of work that transforms and processes data or information from the tool to the end-user. The eCentre session can have producers as sources and users or outputs as end-points. A session transforms data generated by the producers and delivers them to the users. A producer is a component that generates data. Another session, tool data or device data can be a producer. A user is a consumer of the data transformed by the session. For example, a different session or a receiver can be a user. A group of producers is logical association between different producers and users in a session, e.g. data from producer 1 goes to user 1 and user 2.

The system of the present invention allows the mixing of data, sending the data to different users in different states depending on security access rules. The system connects groups of data producers to different users, routing the information as XML based on associations of users and producers.

II. Session Services Methodology

Sessions also include the correlation of users to a set of available services. These services include: Remote Tool Operation, File Transfer Capability, Chat, Data Filtering, Data Persistence and Data Proxy.

A session controls a user's access to a tool. The system of the present invention can control the services that belong to a session. A service is a component of a session that relates to the ability of a user to access a tool (e.g. FTP, Remote Tool Operation). Sessions can also be categorized, for example, based on security levels such as "Top Secret", "Secret", "Unclassified", and affinities can be created to users and tools.

A. Data Flow Service

In an eCentre environment, the data flow service provides the means for obtaining real-time equipment data as it comes off the tool. When the data flow service is running, the eCentre Application Server receives the XML in a special destination object called a tool topic. Since there is no direct access to a tool, the remote user's request for data is routed through the session. As data is collected off the tool, it is sent to the eCentre Application Server by the Tool Gateway Server in an XML format. Tool topics (similar to queues) are used to receive the XML data from the tool and then transfer the XML to the appropriate user topic. User topics represent users who are associated with the currently running session. Data flowing off the tool is returned to the user via the session.

Figure 6:
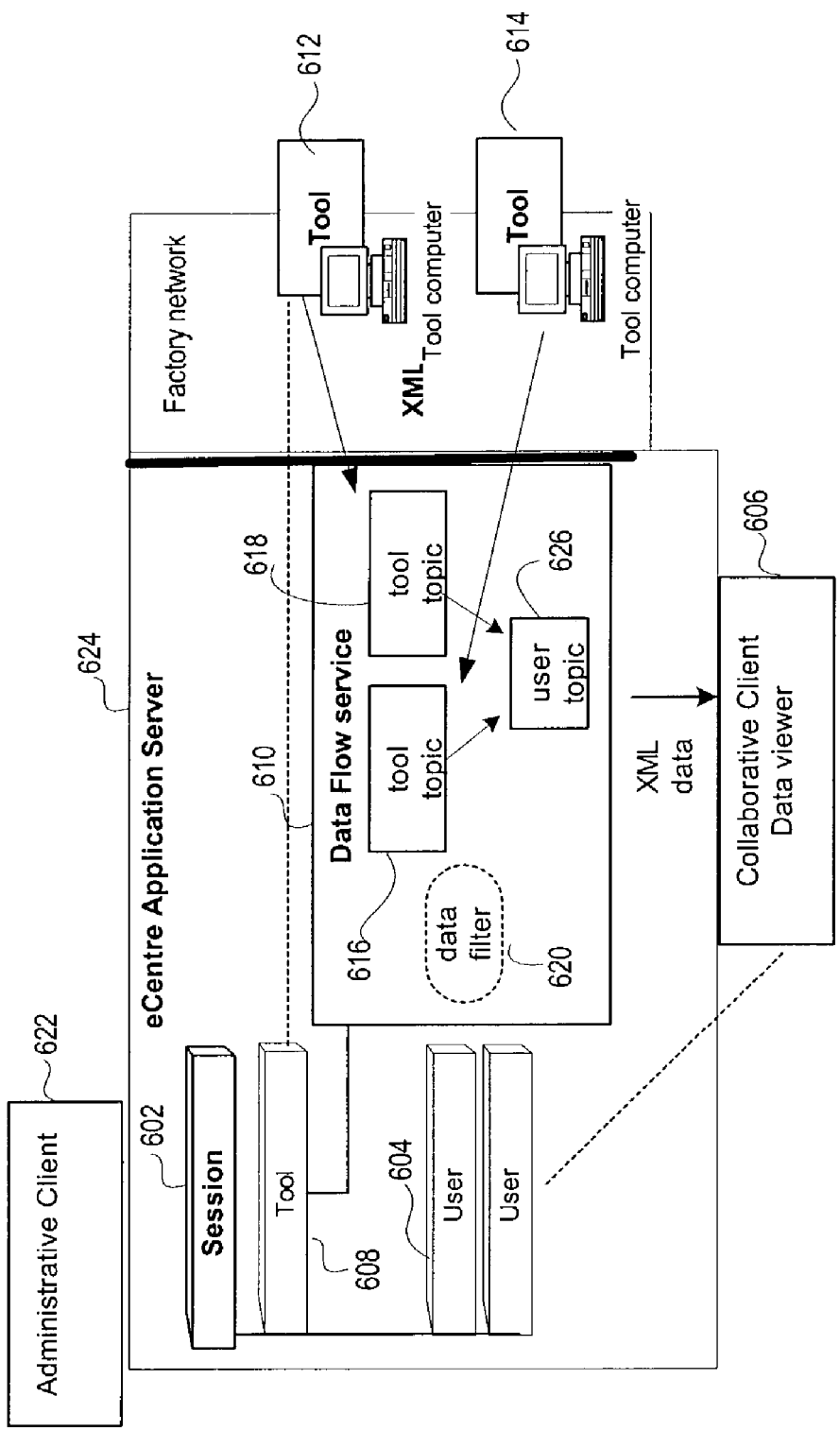
FIG. 6 depicts an exemplary embodiment of a data flow service according to the present invention.

FIG. 6 shows an exemplary embodiment of a session 602 having a user 604 and a tool 608, where one of the services provided by the tool 608 is the data flow service 610. The data flow service 610 collects data from tools 612 and 614 after the data has been transformed to XML and received by tool topics 616 and 618, respectively. The data flow service 610 can then apply user filters 620 to further transform the tool data. Filtering is discussed in greater detail below. The filtered data is then received by a user topic 626, where is it available to the user 604. The administrative client 622 has started session 602 on the application server 624. After the data has been received from the tool 608 and transformed and filtered, it can be made available to users outside of the FAB network via the collaborative client 606.

In addition, the collaborative client 606 lets users view graphs that show trends lines that represent the equipment data. Optionally, the session could be configured to store tool data in a repository (such as DB2) thereby reducing the risk of sensitive data being released.

B. Data Filtering Service

The session provides data to all the users connected to the same session, with filters defined per user and/or tool. If a user needs different data, a separate filter will be used to present that data to that user.

A session also includes filter based services. These types of filter services regulate which users have access to which tool data and the format in which the user can see the data. For example, a particular tool may report an operating temperature. One filter for one user may allow the user to see the temperature reading, but only when the temperature exceeds a specific number, such as 50 degrees. Another filter for a second user may only show the second user that the temperature is "high" when the temperature is above a threshold, and "low" when the temperature is below a second threshold. In the second case, the OEM may not want the ICM users to know the exact temperature of the tool, but may want to alert the user that the temperature is running high or low. Filters can also prevent an OEM from aggregating data from multiple tools, if the ICM does not want to allow such aggregation. Filters can be implemented, for example, in XSL. Filters can be designed to address specific users, user types, data types and many other parameters of data and access.

1. XSL Data Filtering Methodology

An XSL filter can be used to protect data by modifying, filtering and/or transforming sensitive FAB data before release to an OEM. The FAB data can be transformed to end-user data through XSL. This allows the OEM client to diagnose the tool remotely by analyzing real-time data (in FAB terms called "reports") generated by the tool. The filtering process includes interfacing with a tool, capturing the raw format data, and translating the data into a human readable (XML based) format. In order to prevent undesirable data aggregation or to protect sensitive data, the tool data can be transformed prior to delivery to the OEM client.

The data filtering methodology is based on a combination of XML and XSL. For example, tool data is XML based, data transformations, such as session rules or policies, are XSL based, and the output of the transformations is XML based. By using this methodology, every piece of information a tool generates can be controlled, and each user, each tool, and each session can have its own rules/policies.

C. Remote Tool Operations (RTO) Service

In diagnosing a tool, a preferred method is to be able to perform a diagnostic operation as if the support person or OEM client were in front of the tool's screen. An exemplary embodiment of the present invention allows the OEM client to be virtually in front of the tool. The present invention uses screen capturing and encrypted information streaming to send the information to a client application. The OEM client then runs the client application locally to the client, regardless of where the tool is. To increase the security of the information transfer, industry strength cryptographic packages can be used to encrypt the information, and proxy technologies can be used to overcome firewalls.

The system of the present invention allows a real-time view of the tool screen regardless of the operating system of the client. A RTO server is installed on the tool to allow the client to retrieve information from the tool. The RTO infrastructure proxies the screen information to the remote client across the secure shared connection. It is used to operate a tool on the plant floor remotely, including remote control and video observation. Unique proxy design using secure sockets and flexible connectivity types. The Remote Tool Operations can be controlled from an eCentre session, with control of the tool being allowed for only one user at a time.

In addition to being able to operate and diagnose a tool remotely, an exemplary embodiment of the present invention can also remotely manage the maintenance of software applications on semiconductor process tools. This allows the OEM clients to maintain remotely any software that is deployed on the tool without being present at the tool.

D. Managed/Shared File Transfer Service

The managed/shared file transfer capability of the present invention enables the system administrator to control what, where, and when a file can be transferred to the tool. First, no file can be transferred directly to or from a tool. All files must go first to a staging area, which is unique per eCentre session and tool. Only after going to the staging area can the file then be transferred to or from the tool. Second, the system administrator controls, using session policies, what types of files can be sent to the tool and where they will be placed in the tool file system. The session policies can also control, for example, which users can access the staging area. Third, the system administrator controls when the file can be uploaded to the tool by allowing access based on time intervals, preventing files from being transferred when the tool is not in the proper state. The system administrator can filter the files that an OEM client can see on a tool in many ways, for example, based on the file name and location, in addition to time restrictions.

E. Managed/Shared TELNET Sessions Service

The OEM clients can use TELNET to access a tool based on policies, as defined in a session. These policies are controlled by the system administrator and are specific to the session, users and tools involved. The policies allow the administrator to restrict the access to TELNET features based on rules associated to users, tools and sessions. The system administrator can also see and record any TELNET activities of an OEM client with minimal invasion. The eCentre session provides the capability of centralized control of the TELNET sessions.

F. XML Data Persistence Service

The system of the present invention can store semiconductor device data in a database, preferably in a keyed relational database. Tool data, in the form of XML documents, are flattened by converting XML tags into lists and items to be stored in the database. This allows the tool data to be stored in the database in a format for fast retrieval. Tool data are stored in groups of tables belonging to a session or a tool. The tool data may be transformed prior to storage. For example, minimum, maximum or average values could be stored instead of the raw data.

The database schema and settings are tuned for high performance commits and retrievals. The intervals for the storage can be adjusted in ways that are pertinent to the unique settings of the eCentre installation.

The data storage feature provides support that allows information received from the tool to be sent to storage database. The software has the ability to assign classification levels to all tool parameters. Classified data will be stored in the database where it can be selectively retrieved. Optionally, the data could be stored as one of the following formats: compressed XML data, average data, and exact data.

Compressed data stores the event XML paragraph compressed with the event header normalized. This allows the data to be stored in the XML format recommended by SEMATECH without requiring large amounts of storage space. In order to be retrieved, the data must first be uncompressed and then parsed so that a reporting tool can take full advantage of the data.

Averaged data represents an optimized method to store data for fast retrieval within reasonable storage space. In order to achieve this, average intervals and holding periods are predefined. An average interval is a time-slice in which all tool parameter values are accumulated. The expiration of the interval stores only the average value, minimum value, maximum value, and the number of times the value occurred.

Data will not be held for more than the predefined holding period. Both averaged intervals and holding periods can be specified in milliseconds. If the average mode is chosen, the exact XML data will continue to be stored compressed. All intervals are time stamped, and if no data arrives within that interval, then no entry is written to the database.

Exact data is for parameters that do not have a high frequency rate but where the exact value and time stamp are very important and the data needs to be quickly retrieved. Similar to averaged data, the full XML paragraphs are stored compressed.

In an exemplary embodiment, a data storage configuration can cause compressed data to be held for 15 days; average data for 5-second intervals for one day, and average data for one-hour intervals for 15 days.

III. Session Activity Version Control and Rollback Methodology

While version control and rollback mechanisms are common in software and database applications, such mechanisms have not previously been applied to the area of e-Diagnostics for real-time tool diagnosis and repair. Changes can be made to tool settings and control files; if the new operation is not better, everything can be "rolled-back" to previous settings with one operation. For example, the OEM client can perform an FTP file upload on the tool. Prior to the physical upload, the system of the present invention can retrieve the current file from the tool, assign a version to the file and secure-store the file. Only after this operation is done will the system upload the new file. If the new file causes the tool to perform undesirably, the previous version of the file can be reinstated by an administrator to return the tool to a well-behaved state. To prevent the tool from being left in an unstable state in a rollback, the tool can be protected, for example, from being accessed and controlled by two or more OEM clients at the same time.

IV. eCentre Session Interactions

In order for the eCentre session to perform its duties, several interactions are required. The eCentre session has a graphical user interface (GUI) that can allow the user to perform activities. The activities are divided into two major categories: Administrative and User. The Administrator GUI allows for the maintenance of sessions and the related users access. The User GUI allows for interaction with the services and access to the data provided.

Figure 7:
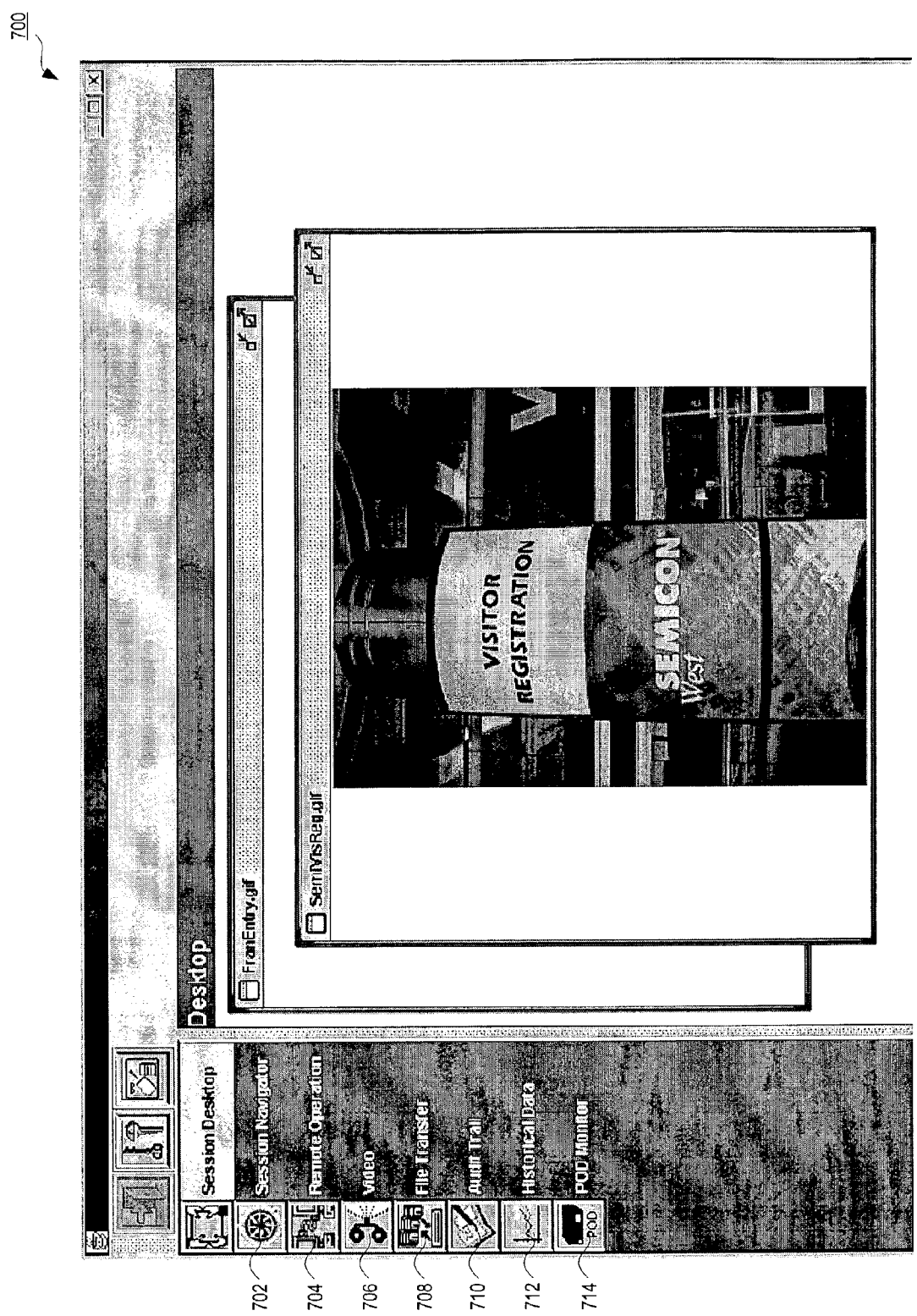
FIG. 7 depicts an exemplary embodiment of a desktop GUI according to the present invention.

For example, FIG. 7 shows the Desktop GUI 700. From the desktop 700, a user is able to navigate through the available sessions 702, operate a tool remotely 704, receive video streams from a camera attached to the tool 706, receive still pictures (for high definition analysis) of the tool or other data files 708, audit user interactions in a session 710, perform data analysis with historical data 712, and check on the tool gateway server activity 714.

Figure 8:
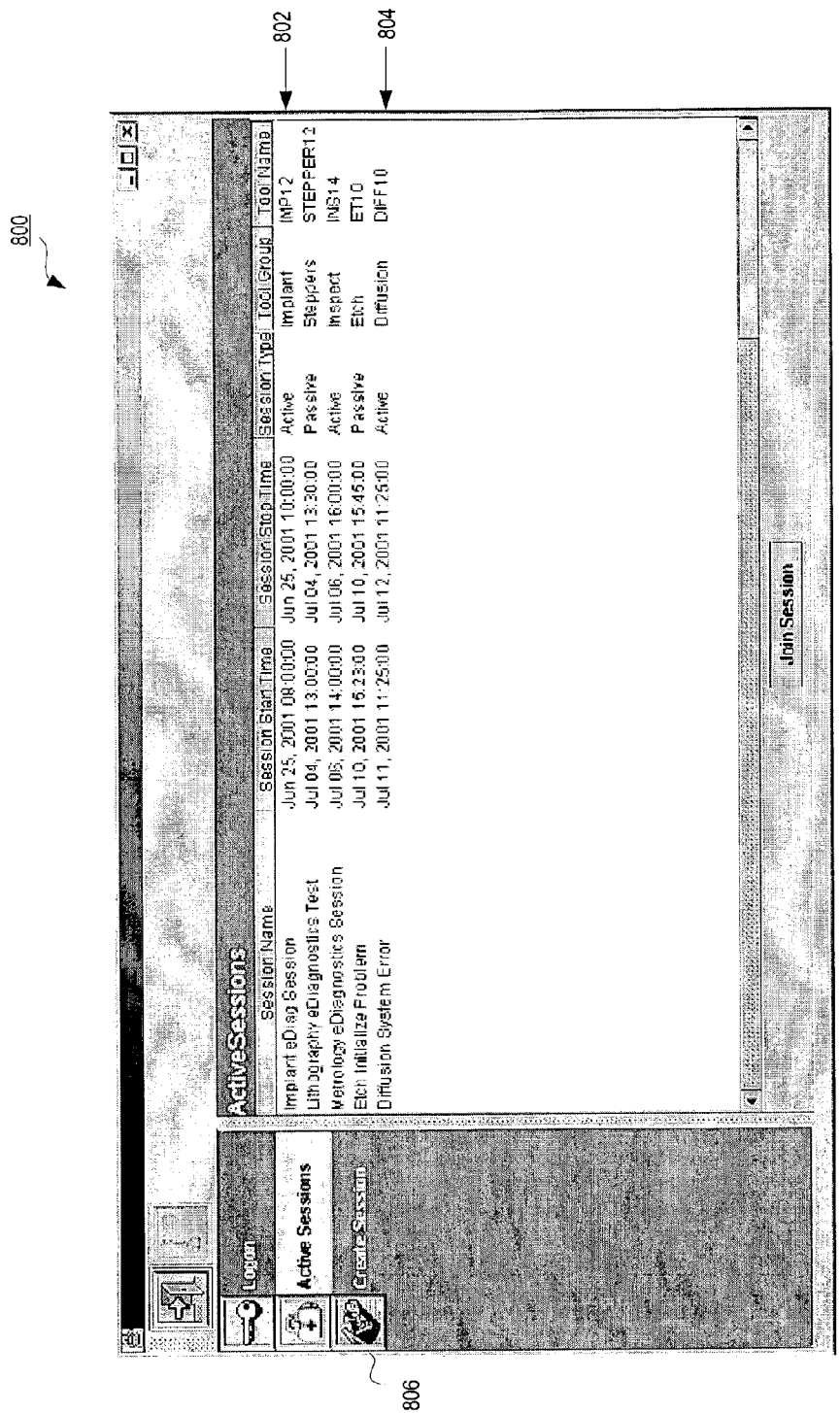
FIG. 8 illustrates an exemplary embodiment of an active sessions list according to the present invention.

FIG. 8 illustrates an active sessions list 800 that shows the place where all running sessions are displayed. From here a user has the ability to join a particular session, such as, for example session 802 and 804, in order to receive needed data. In addition, the user can also create a session from button 806, if the currently active sessions do not meet the user's needs.

Figure 9:
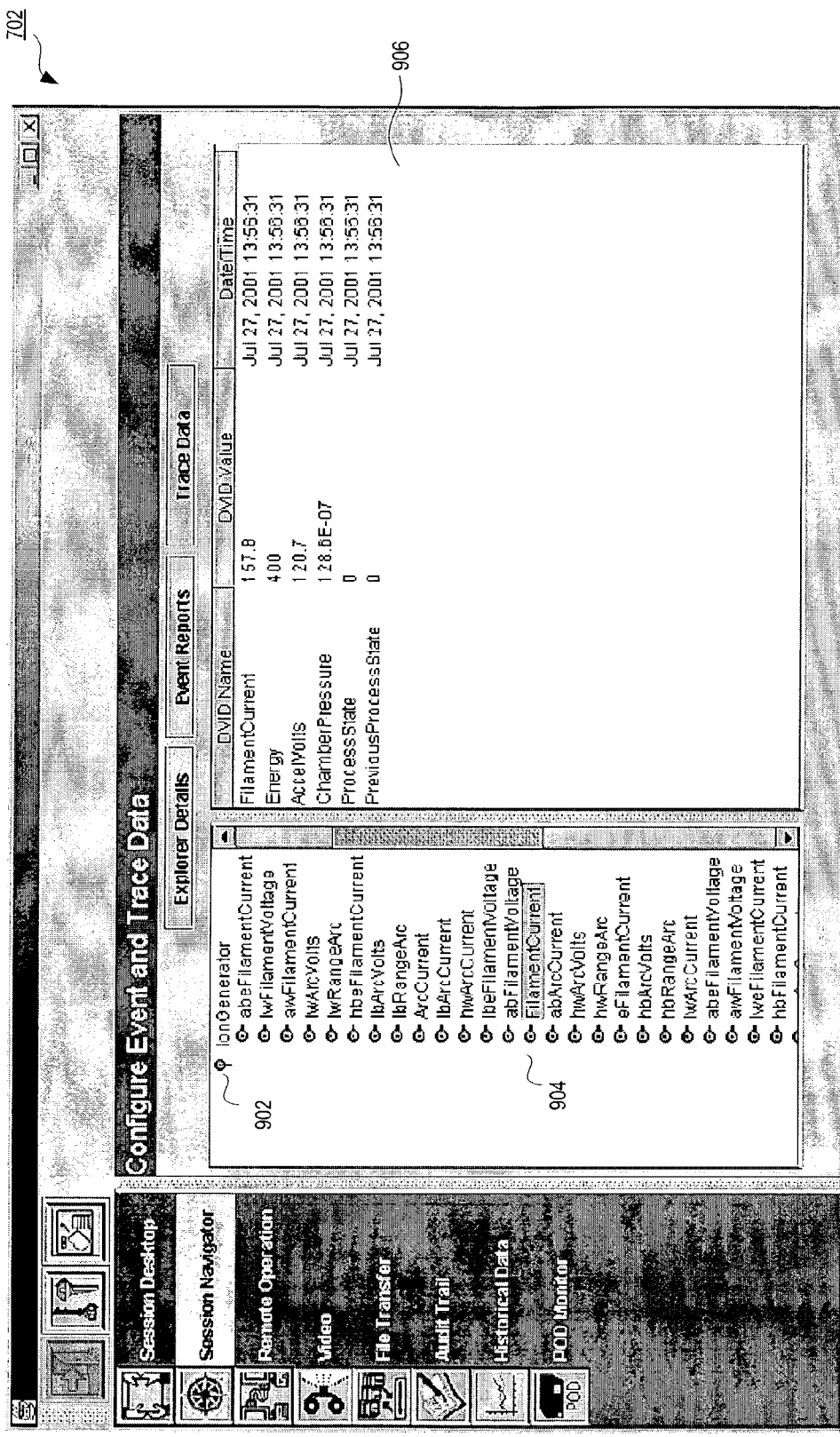
FIG. 9 illustrates an exemplary embodiment of a session navigator according to the present invention.

FIG. 9 illustrates a GUI of the session navigator 702 that uses one method to configure event and trace data. It shows the place where a user can see the details of data received from a tool in form of an XML message. For example, for a tool 902, the data from a specific tool element 904 can be displayed in data window 906.

Figure 10:
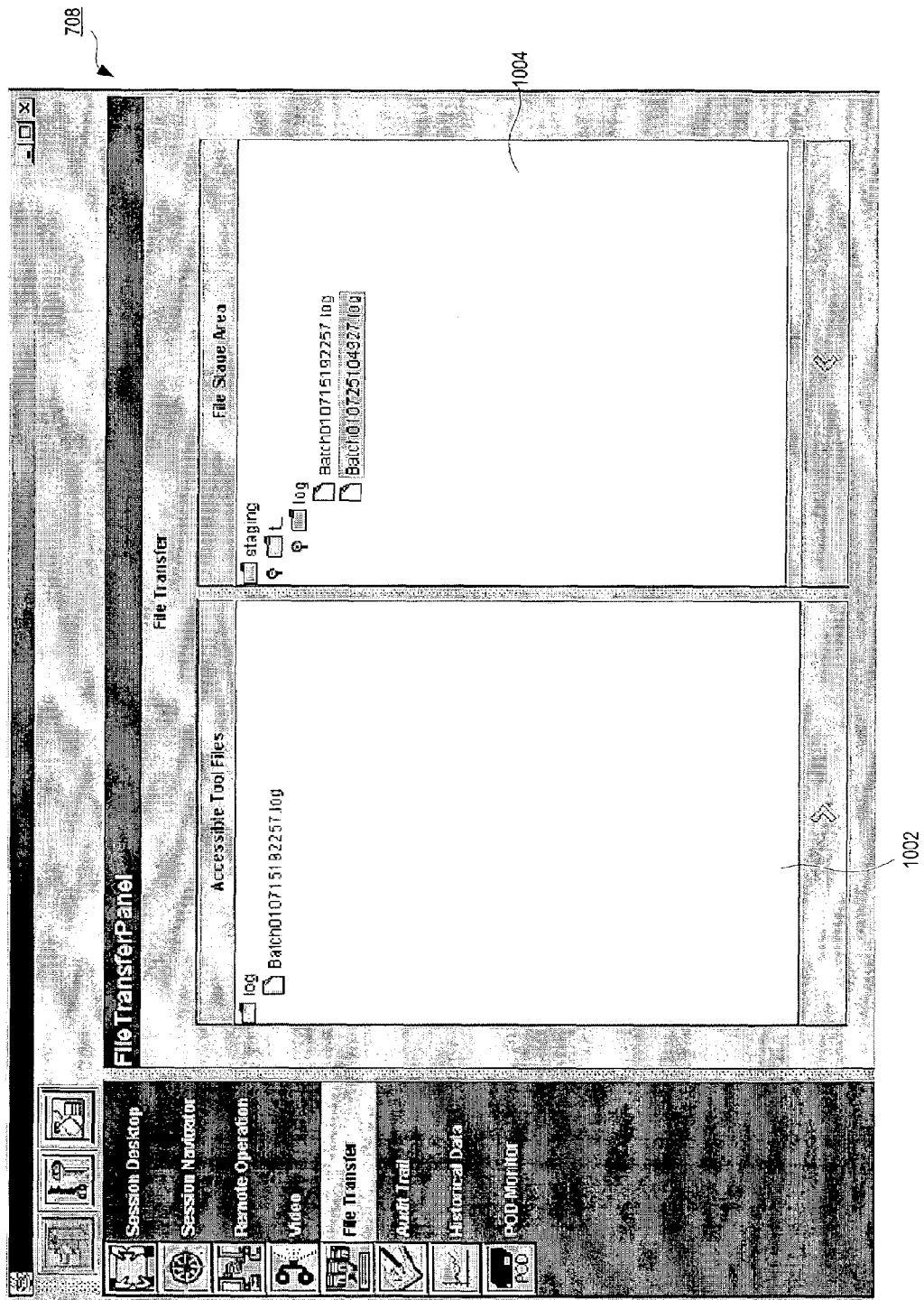
FIG. 10 illustrates an exemplary embodiment of a file transfer and versioning panel according to the present invention.

FIG. 10 illustrates a file transfer and versioning panel 708 that shows the staging area 1004 where a user can transfer tool files 1002. For example, new tool data updates can be transferred to the tool from the user's location, via the staging area 1004. The file transfer and versioning panel 708 can also be used as a staging area controlling the versioning of the files that are uploaded into the tool. The file transfer and versioning feature allows the users to perform different tool updates without the risk of destroying the current set of parameters that governs the tool.

FIG. 11 shows an audit trail GUI 710 that shows part of the administration of a user, in particular the audit trails seen in window 1102. The activity of all the users connected to the system can be captured, for example, when the user logged onto the system, when the user created or joined a session, and when an access violation occurs.

Figure 12:
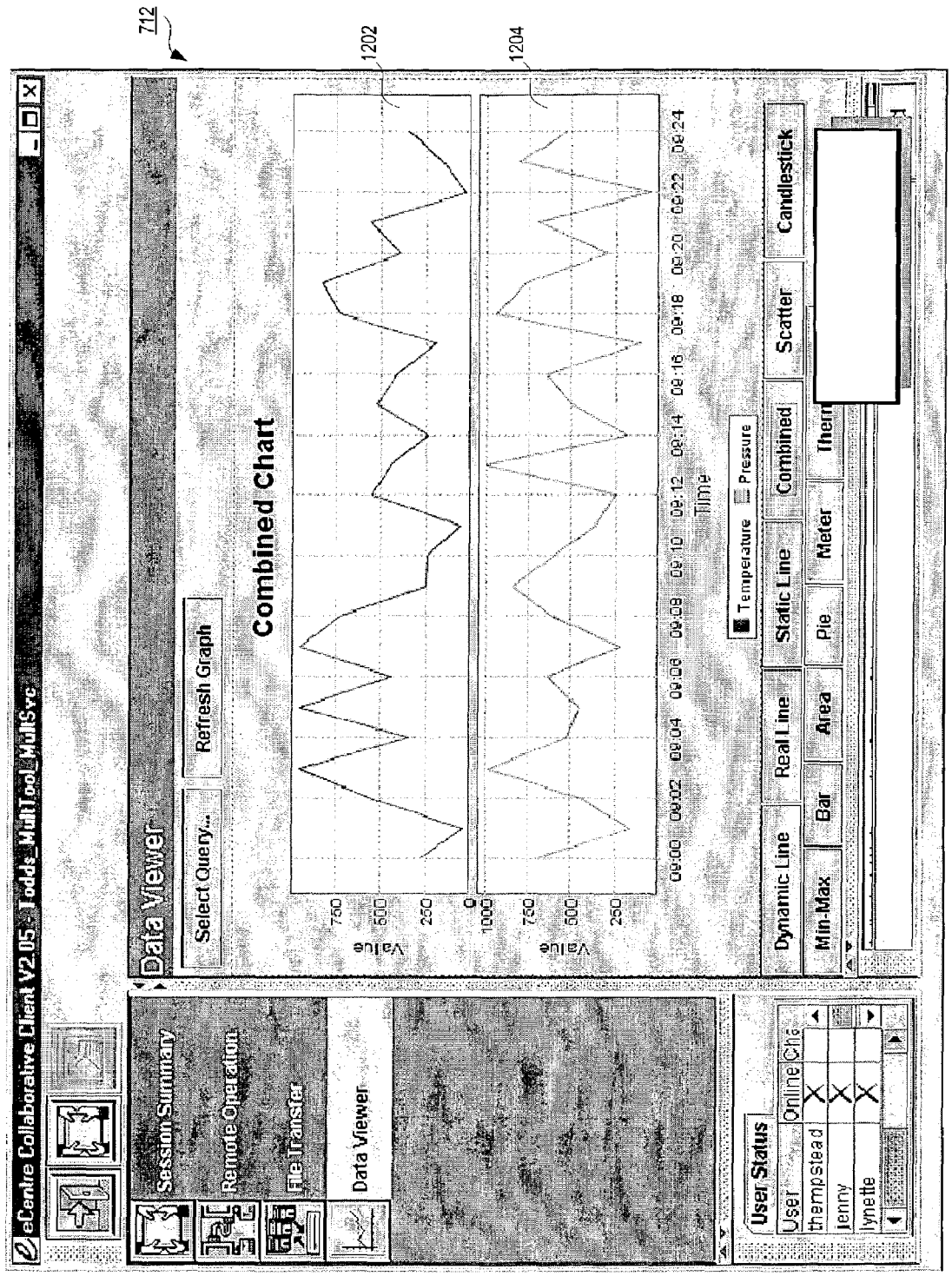
FIG. 12 illustrates an exemplary embodiment of a data GUI according to the present invention.

FIG. 12 shows an exemplary embodiment of a data viewer GUI 712 according to the present invention. A user can access live tool data or stored historical data about a tool or a collection of tools. The data can be presented in a variety of graphical methods. For example, a user can view a combined graph of the temperature 1202 and the pressure 1204 of a tool.

Figure 13:
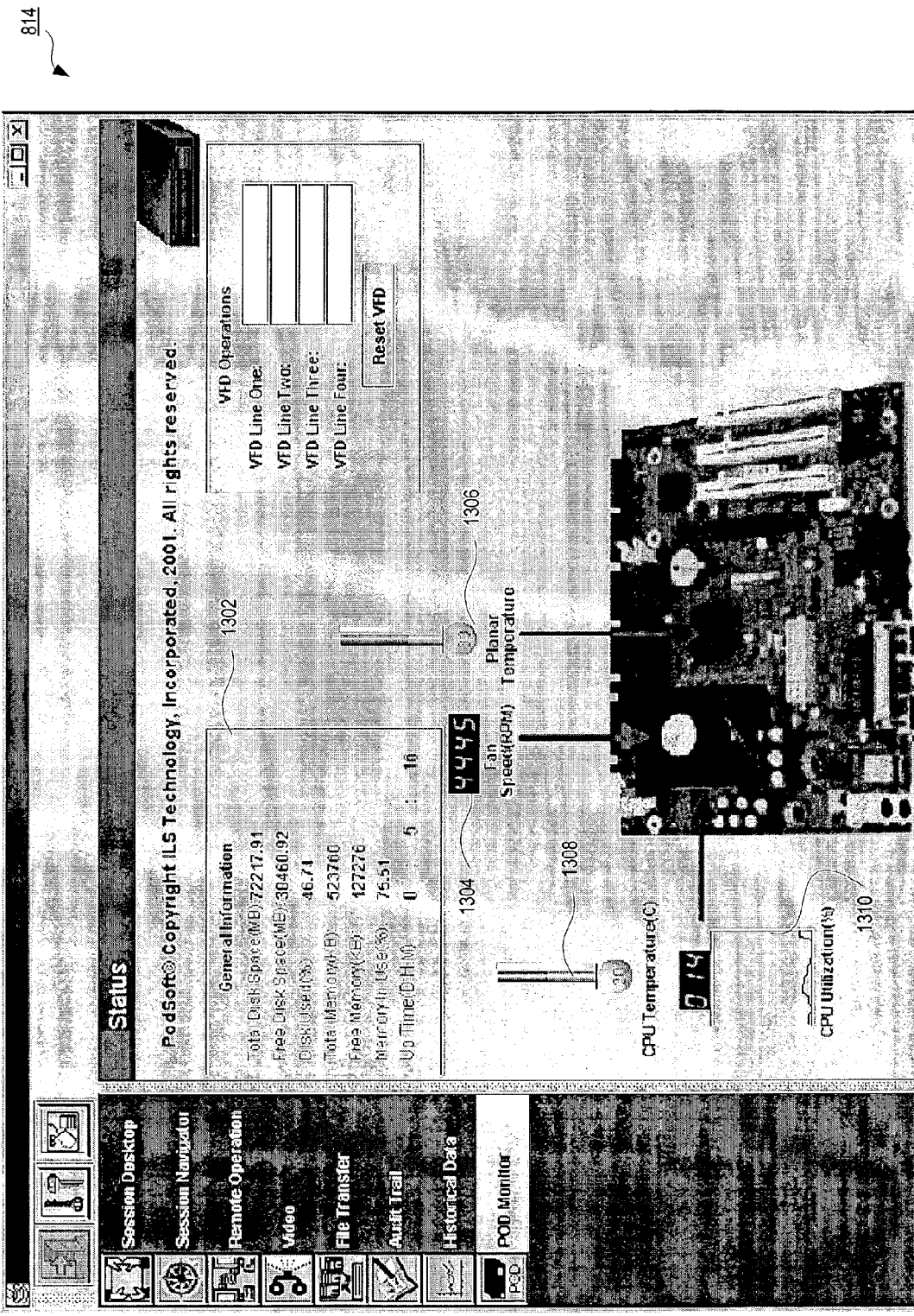
FIG. 13 illustrates an exemplary embodiment of a tool gateway server status interface GUI according to the present invention.

FIG. 13 shows a tool gateway server status interface GUI 714 that shows the screen where the user can check the status of a tool gateway server. For example, the user could check general information 1302 about the tool gateway server, or more specific information such as, for example, a fan speed 1304, a planar temperature 1306, a CPU temperature 1308, or a CPU utilization 1310.

Figure 14:
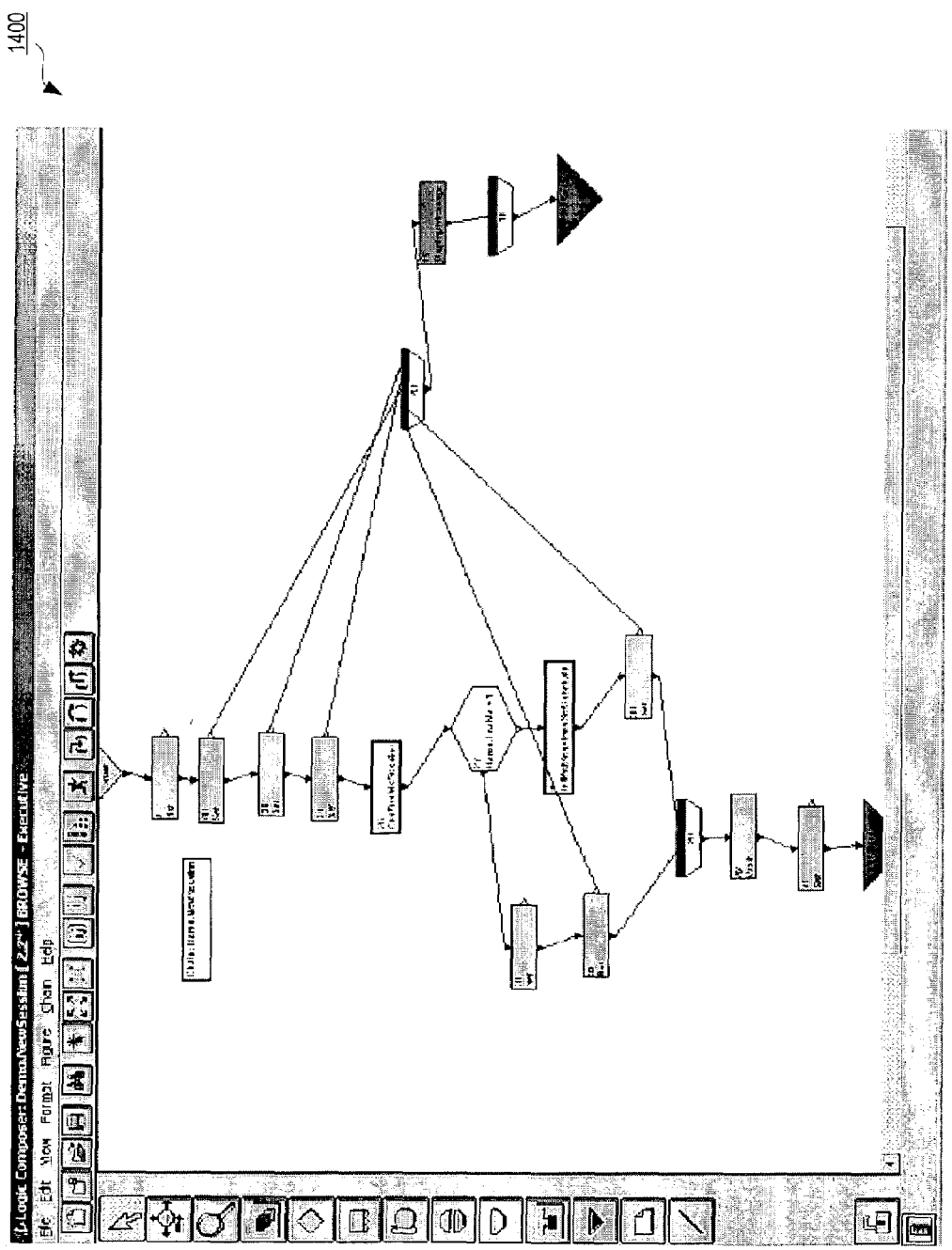
FIG. 14 illustrates an exemplary embodiment of an eCentre business rules interface GUI according to the present invention.

FIG. 14 shows an eCentre business rules GUI 1400 that provides the ability to update business logic graphically. This can be used to create business rules that can be incorporated into the operation of the session. Session activities will be limited or allowed based on business rules. Session activities can also trigger external events such as sending an e-mail or writing to a database as defined by the business process.

V. Connectivity Methodology

In the creation of the e-diagnostic system between the OEM and the FAB there is a requirement to establish a direct or shared connection between the parties. In general, this can be accomplished through Internet access or Virtual Private Network (VPN) connections. There is another component of the eCentre system that allows for the connection of the FAB to OEMs.

A. Service Net

Service Net is a network connection that allows the many OEMs and many FABs to connect with each other without requiring a dedicated link for each combination. For example, unlike with service net, with a VPN, there would be a separate VPN connection from a first FAB to each OEM in the system. With Service Net, there is a single outbound connection which manages access to the OEMs. For example, one VPN connection from each OEM can connect to multiple FABs, and one VPN connection from each FAB can connect to multiple OEMs.

The Service Net provides secure communications for all OEM and FAB constituents by preventing unauthorized cross-connects between OEM's and/or customers. Each constituent controls its own data. This brokered network maintains separation of accounts.

Figure 15:
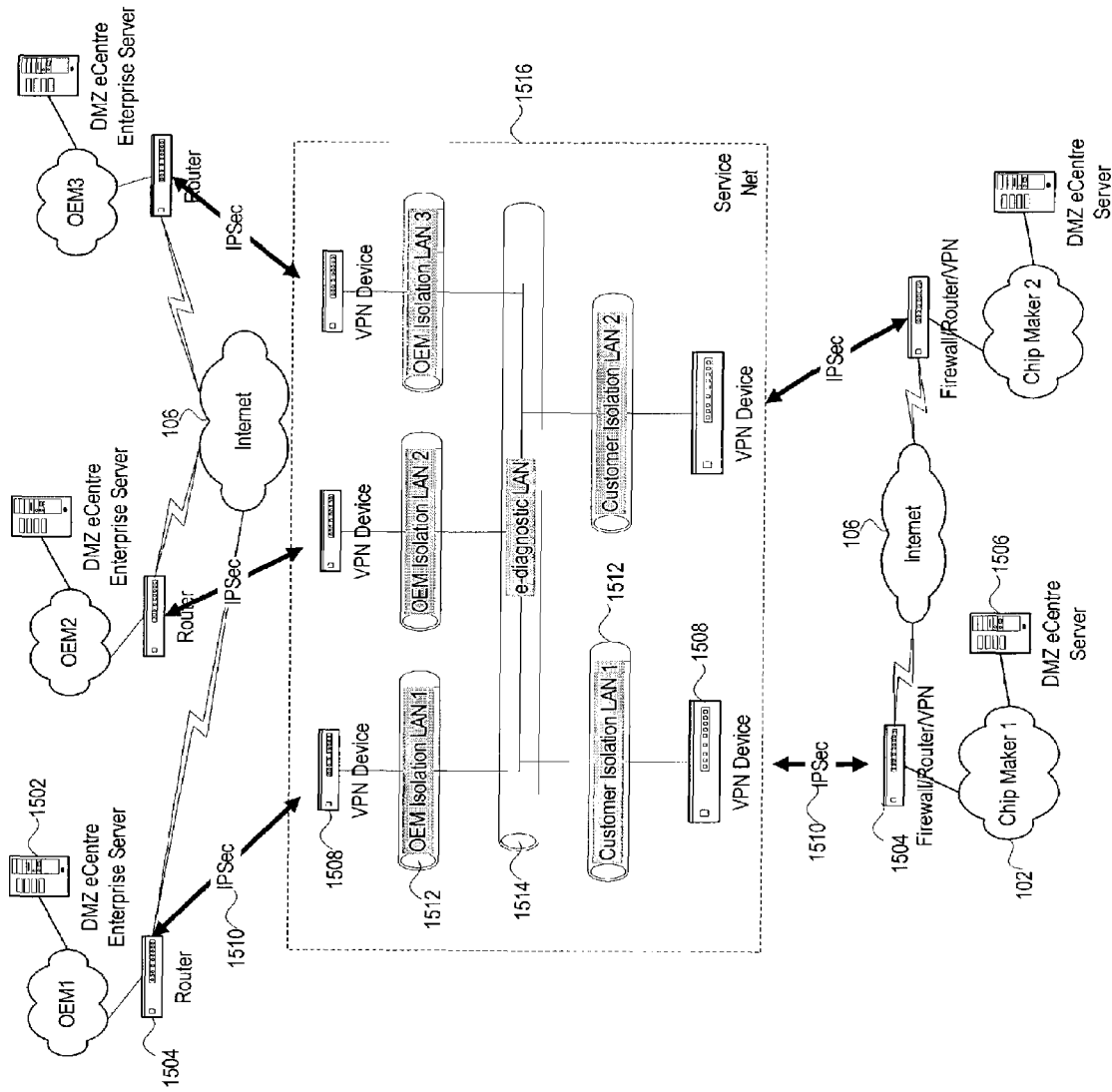
FIG. 15 shows a block diagram of an exemplary embodiment of a Service Net of the present invention.

FIG. 15 shows an exemplary embodiment of the service net according to the present invention. One or more OEMs 108 each comprising a DMZ eCentre Enterprise Server 1502 is each coupled through a router 1504 to the Internet 106. The router 1504 can be a combination router/firewall/VPN or can be comprised of separate components providing router, firewall and VPN functions. One or more FABs 102, each comprising a DMZ eCentre Server 1506, is also coupled to the Internet 106 through a router 1504. The router 1504 for each OEM and FAB connects to a separate VPN device 1508 via a secure connection 1510. Each OEM and FAB VPN device 1508 terminates in its own dedicated isolation LAN 1512. The dedicated isolation LANs are in turn coupled to the e-diagnostic LAN 1514. The e-diagnostic LAN 1514 is a combination of network hardware and software that makes logical point-to-point connections between the OEMs and the FABs. Although each OEM 108 could connect to each FAB 102, the e-diagnostic LAN 1514 controls which OEMs can actually connect to a particular FAB according to access rules. In this way, the FABs and OEMs need only manage one connection: to the e-diagnostic LAN 1514. The e-diagnostic LAN controls subsequent connections to the other entities on the network. The service net 1516 is made up of the e-diagnostic LAN 1514, the dedicated isolation LANs 1512, and the VPN devices 1508. The service net 1516 does not comprise any applications/logic or databases outside the firewalls.

VI. Data Brokering System

In the tuning and diagnosis of semiconductor equipment, it is necessary to have additional data about the wafers produced by the tool to understand yield as it relates to tool settings. This data is often collected in downstream processes by additional tools, often from other vendors. Since OEM equipment makers do not share this data with each other, the optimal tool settings are not always achieved. OEM equipment makers are often reluctant to expose data from their tools, which could be examined and used by competitors to denigrate the OEM tools or to used to improve the competitors' tools. These same OEM suppliers could be willing to share this data, if the data was limited to wafer data, and not how the wafer data was collected.

Figure 16:
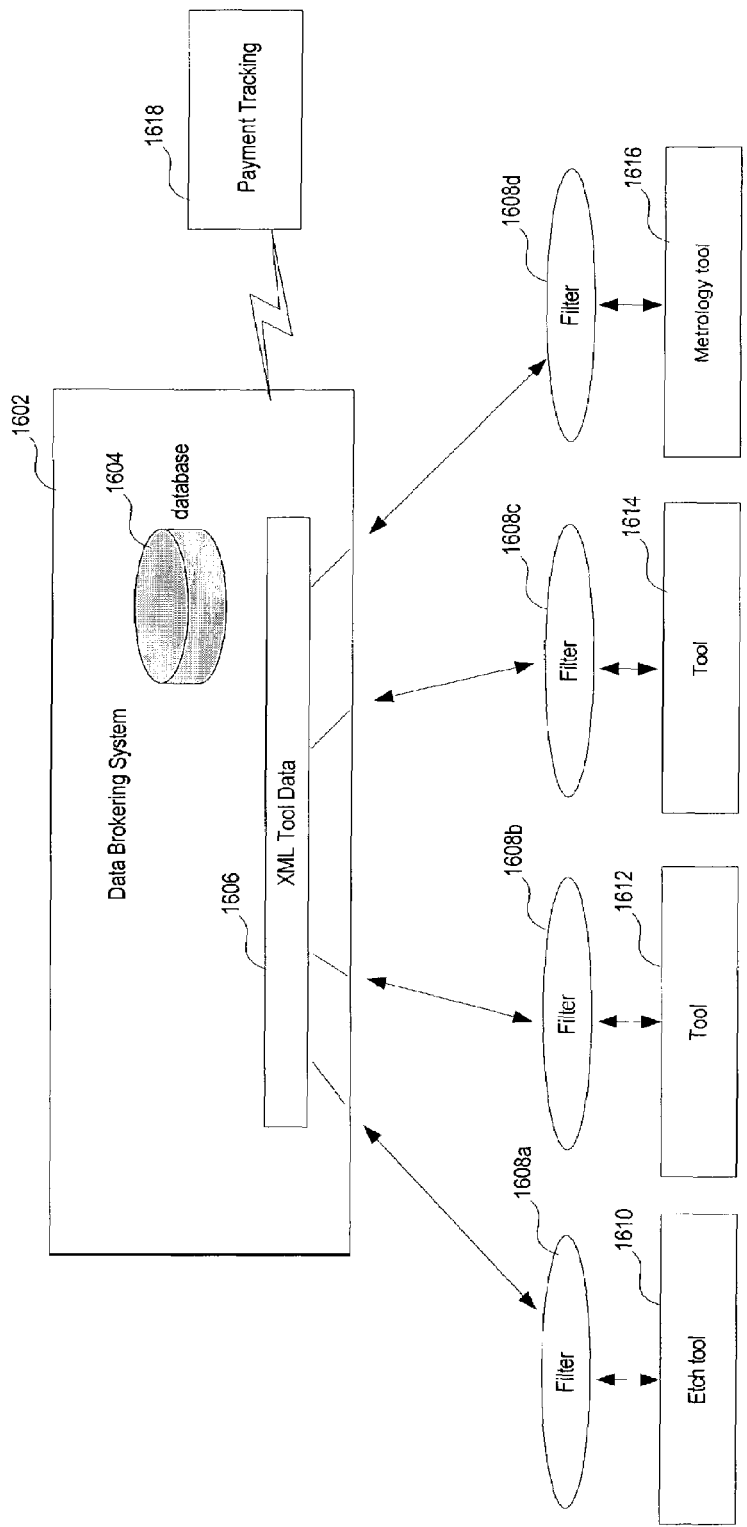
FIG. 16 depicts the data brokering service of the present invention.

Therefore, as seen in FIG. 16, an exemplary embodiment of the present invention includes a data brokering system 1602 for semiconductor wafer data within a FAB that allows for the request for data on a particular wafer to be satisfied by a system that responds to that request without providing an OEM any specific information. Data from tools 1610, 1612, 1614 and 1616 can be filtered by respective filters 1608a, 1608b, 1608c, and 1608d and collected by the data brokering system 1602 as XML tool data 1606. The XML tool data 1606 and be stored in a database 1604. Wafer data from each tool 1610-1616 is then available to the other tools without providing any specific tool information.

Given that the data has value to the different tool makers, the system also includes a fee payment mechanism 1618 based on a variety of algorithms including payment by the size of data (e.g. Mb), type of data (e.g. metrology), or type of wafer produced (e.g. 300 mm). OEMs can consult this brokering system with a request for wafer data. The system shows a list of data available and the related charge for that data. If acceptable, the OEM requestor can download the data for analysis. Data can be stored in a standard XML format, or can contain a list of data that would be reviewed by the buyer.

The data exchanges can also be done in an automated fashion to improve the overall productivity of the plant floor. For example, data from downstream operations can be automatically fed into the upstream tools for analysis of their production operation. Tool settings can be modified to improve performance. This data is fed through the broker system, maintaining autonomy of the various data suppliers and providing financial rewards for their help in improving the productivity of upstream tools.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A system for managing secure network connections among multiple FABs and OEMs, comprising:
   a connection hub external to the FABs and the OEMs, the connection hub comprising:
   a first plurality of VPN devices, one for each of a plurality of FABs;
   a second plurality of VPN devices, one for each of a plurality of OEMs;
   a first plurality of dedicated isolation LANs, each one coupled to one of said first plurality of VPN devices;
   a second plurality of dedicated isolation LANs, each one coupled to one of said second plurality of VPN devices; and
   an e-diagnostic LAN, coupled to said first and second pluralities of dedicated isolation LANs, and operative to connect any OEM to any FAB according to authorization rules
   wherein each OEM and FAB need only maintain a single connection to the connection hub to communicate with multiple FABs and OEMs, respectively.

2. The system of claim 1, further comprising:
   a first plurality of routers located one each at the FABs, each router coupled to one of said first plurality of VPN devices with a secure connection; and
   a second plurality of routers located one each at the OEMs, each router coupled to one of said second plurality of VPN devices with a secure connection.

3. The system of claim 2, wherein said first and second pluralities of routers are a combination router, firewall and VPN device.

4. The system of claim 1, wherein said first and second pluralities of dedicated isolations LANs each maintain a single connection to said e-diagnostic LAN.

5. The system of claim 1, wherein said e-diagnostic LAN comprises network hardware, network software, and means for making logical point-to-point connections between OEMs and FABs.

6. A method for providing secure network connections among multiple FABs and OEMs, comprising the steps of:
   Providing a connection hub external to the FABs and OEMs, the connection hub comprising:
   a first plurality of VPN devices, one for each of a plurality of FABs;
   a second plurality of VPN devices, one for each of a plurality of OEMs;
   a first plurality of dedicated isolation LANs, each one coupled to one of said first plurality of VPN devices;
   a second plurality of dedicated isolation LANs, each one coupled to one of said second plurality of VPN devices; and
   an e-diagnostic LAN, coupled to said first and second pluralities of dedicated isolation LANs, and operative to connect any OEM to any FAB according to authorization rules;
   receiving a request at the e-diagnostic LAN from one of a plurality of OEMs to connect to one of a plurality of FABs;
   determining, at the e-diagnostic LAN, if said one OEM is authorized to access said one FAB;
   connecting said OEM to said FAB with a secure point to point connection when said OEM is authorized to access said FAB; and
   not connecting said OEM to said FAB when said OEM is not authorized to access said FAB
   wherein each OEM and FAB need only maintain a single connection to the connection hub to communicate with multiple FABs and OEMs, respectively.

7. The method of claim 6, wherein said e-diagnostic LAN comprises network hardware, network software, and means for making logical point-to-point connections between OEMs and FABs.

8. The method of claim 6, wherein each OEM and FAB need only maintain a single connection to the e-diagnostic LAN to communicate with multiple FABs and OEMs, respectively.

* * * * *